United States Patent [19]

Bartholomew

[11] Patent Number: 5,160,121
[45] Date of Patent: Nov. 3, 1992

[54] SHOCK ABSORBING COMPRESSIONAL MOUNTING APPARATUS

[75] Inventor: Donald D. Bartholomew, Mt. Clemens, Mich.

[73] Assignee: Proprietary Technology, Inc., Southfield, Mich.

[21] Appl. No.: 674,200

[22] Filed: Mar. 25, 1991

[51] Int. Cl.$^5$ .......................................... F16B 23/00
[52] U.S. Cl. .................................. 267/136; 267/152; 267/181
[58] Field of Search .......... 267/136, 140.1 R, 140.1 A, 267/141.1, 141.2, 141.3, 141.4, 141.5, 152, 33, 158, 165, 180, 181, 30, 272, 182, 158

[56] References Cited

U.S. PATENT DOCUMENTS

| | | | |
|---|---|---|---|
| 2,171,185 | 8/1939 | Maier | 267/181 |
| 2,678,796 | 5/1954 | Roy | 267/33 |
| 2,822,164 | 2/1958 | Boschi | 267/140.4 |
| 3,159,391 | 12/1964 | Wilfert et al. | 267/136 |
| 3,416,783 | 12/1968 | Tondato | 267/152 |
| 3,536,313 | 10/1970 | Rice | 267/165 |
| 4,391,436 | 7/1983 | Fishbaugh | 267/141.1 |
| 4,817,921 | 4/1989 | Stevenson | 267/33 |
| 4,874,154 | 10/1989 | Zimbone | 257/140.4 |
| 4,906,154 | 3/1990 | Sheppard | 267/33 |
| 4,919,403 | 4/1990 | Bartholomew | 267/165 |

FOREIGN PATENT DOCUMENTS

| | | | |
|---|---|---|---|
| 677241 | 12/1963 | Canada . | |
| 2501397 | 11/1975 | Fed. Rep. of Germany . | |
| 1440023 | 4/1966 | France | 267/152 |

Primary Examiner—Matthew C. Graham
Attorney, Agent, or Firm—Harness, Dickey & Pierce

[57] ABSTRACT

A variable shock absorbing compressional mounting apparatus. The apparatus includes a housing assembly having first and second housing portions, with the second housing portion being operable to move slidably partially inwardly and outwardly relative to the first housing portion, and a cylindrical, elongated elastomer member having a cylindrical, serpentine-shaped spring therein disposed coaxially within said housing assembly. The elongated elastomer member and elongated serpentine-shaped spring operate cooperatively to provide damping characteristics which vary with the compressional and tensional forces exerted on the elastomer member. When the apparatus is secured to two structures moving towards and away from each other in an oscillatory fashion with varying force, the apparatus operates to dampen the oscillatory motions of the structures in accordance with a first damping characteristic until a predetermined force is reached. At this point the elastomer member/serpentine spring combination provides a second damping characteristic which allows for less damping of the oscillating movements of the structures to which the apparatus is secured. The apparatus is particularly well-suited for such applications as mounting motors, engines and other like-vibration inducing structures to frame-like structures. The apparatus provides the further advantage of significantly attenuating vibrational noise normally otherwise transmitted to the frame-like member to which it is attached.

11 Claims, 1 Drawing Sheet

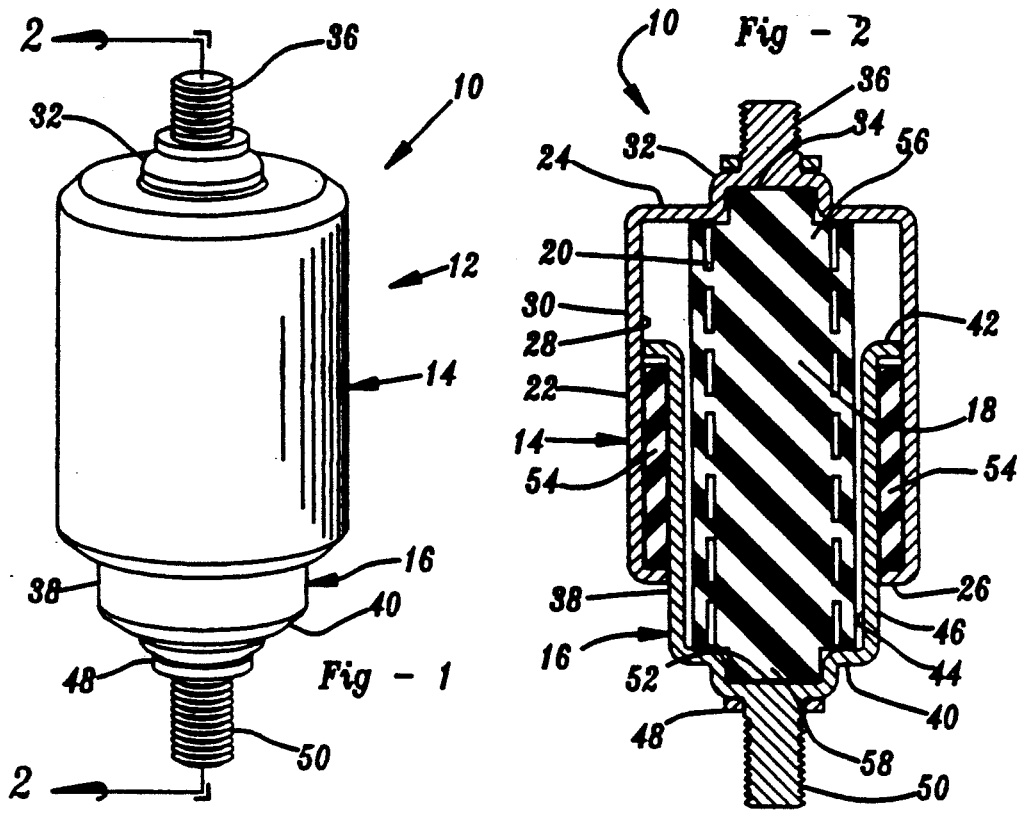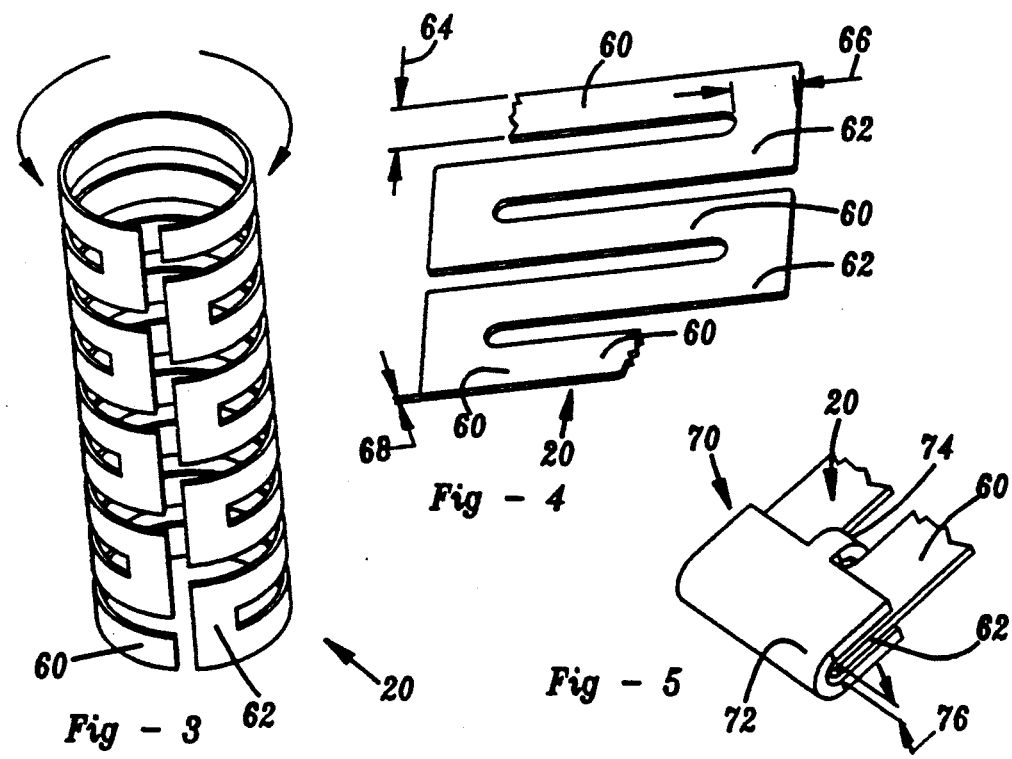

SHOCK ABSORBING COMPRESSIONAL MOUNTING APPARATUS

BACKGROUND OF THE INVENTION

CROSS-REFERENCE TO RELATED APPLICATION

The present application is related to co-pending U.S. application Ser. No. 09/674,404, attorney docket number 0205-00086, filed concurrently herewith. The disclosure of the abovementioned application is hereby incorporated by reference and made a part hereof the same as if fully set forth herein.

1. Technical Field

This invention relates generally to shock absorbing devices and, more particularly, to a shock absorbing compressional mounting apparatus operable to provide a variable degree of damping in engine mounting and other applications.

2. Discussion

When mounting motors, engines and other like objects to frame or frame-like assemblies, it is often necessary and/or desirable to incorporate a mounting structure which eliminates, or at least attenuates, the vibration normally associated with such devices. It is further often necessary or desirable to eliminate, or at least attenuate, the noise associated with vibration from motors, engines and the like.

Previously developed mounting structures which incorporate coil springs, leaf springs or the like generally are limited in their utility in that they are susceptible to transmitting vibrational noise from the engine or motor to the frame to which the mounting device is secured. Most heretofore developed mounting devices which incorporate coil springs or leaf springs also provide only a single, fixed "damping" action in attempting to attenuate the vibrational forces generated by many motors and engines, and to dampen external forces which the mounting device is subjected to.

For example, in certain applications such as with automobiles, engines are subjected to additional forces of acceleration and deceleration. These forces further complicate the process of attenuating vibrational forces and noises which are normally transmitted to the frame of the vehicle, and ultimately to the occupant(s) of the vehicle.

In automotive applications, the limitation of having a fixed damping is particularly troubling. The weight of many automotive engines often requires that engine mounting assemblies be used which provide a high spring constant (i.e., which are relatively "stiff"). Such mounting assemblies, however, often provide too much damping which causes unnecessary and undesirable vibrational movement forces to be transmitted to the frame of the vehicle.

Accordingly, it would be desirable to have a mounting assembly which provided at least two degrees of damping: one which would be relatively high to support the weight of an engine (i.e., to limit the displacement of the spring of the mounting device in a controlled manner up to a certain point of force), and a second degree to enable greater displacement of the spring of the device once a certain point of compressional or tensional force is reached or exceeded.

Accordingly, it is a principal object of the present invention to provide a variable shock absorbing compressional mounting apparatus which provides varying degrees of vibrational damping in response to changing compression and tensional forces exerted upon it when it is mounted in-between a vibration generating device such as a motor and a frame or other like structure.

It is a further object of the present invention to provide a variable shock absorbing compressional mounting apparatus which is operable to more effectively attenuate vibrational noise which would otherwise be transmitted through conventional mounting assemblies to a frame of frame-like structure.

It is still a further object of the present invention to provide a variable shock absorbing compressional mounting apparatus which enables an object being supported, such as an engine, to be supported by a first spring constant, and movement of the engine or other like device to be controlled by a second spring constant.

It is still further object of the present invention to provide a variable shock absorbing compressional mounting apparatus which is more compact and lighter in weight than heretofore developed mounting assemblies.

It is still a further object of the present invention to provide a variable shock absorbing compressional mounting apparatus which may be constructed relatively inexpensively from widely available materials.

SUMMARY OF THE INVENTION

A variable shock absorbing compressional mounting apparatus is disclosed in accordance with the present invention. In a preferred embodiment the apparatus generally includes a housing, an elastomer member disposed coaxially within the housing, and an elongated, serpentine-shaped spring disposed within the elastomer member. The elastomer member and spring disposed therein operate cooperatively to provide variable degrees of damping as compressional forces exerted on the housing increase and decrease.

In one preferred embodiment, the housing incorporates first and second housing portions, with the second housing portion being disposed partially within and in coaxial alignment with the first housing portion. When the housing is secured at opposite ends between two structures moving towards and away from each other in an oscillating fashion, such as an engine of an automobile and a frame of the vehicle, the apparatus operates to provide at least a first degree of damping until a predetermined amount of force is reached or exceeded, and a second degree of damping once the just-mentioned point is exceeded. The construction of the apparatus of the invention is such that vibrational noise also normally otherwise transmitted from a structure such as an engine to its associated mounting frame is significantly attenuated.

In an alternative preferred embodiment, an independent damping member is secured to portions of the elongated, serpentine-shaped spring to thereby limit flexing of those portions of the spring. This further helps dampen vibrational forces which the apparatus is exposed to.

The various preferred embodiments of the present invention provide apparatus which are relatively small, lightweight and relatively easily constructed. The advantages provided by the apparatus of the present invention are also particularly well-suited to automotive applications where motors, engines and other like vibration-generating structures are routinely subjected to forces of acceleration and deceleration, as well as vibrational forces introduced when a vehicle traverses bumps or pot-holes in roads, as well as dips and peaks in roads.

BRIEF DESCRIPTION OF THE DRAWINGS

The various advantages of the present invention will become apparent to one skilled in the art by reading the following specification and subjoined claims and by referencing the following drawings in which:

FIG. 1 is an elevational perspective side view of a variable shock absorbing compressional mounting apparatus in accordance with the present invention;

FIG. 2 is a sectional side view of the apparatus of FIG. 1 taken along section lines 2—2 of FIG. 1;

FIG. 3 is a perspective view of the elongated, serpentine-shaped spring of the present invention showing more clearly its preferred cylindrical form;

FIG. 4 is a perspective view of a portion of the spring of FIG. 3 with the spring uncoiled to show more clearly its "serpentine" shape; and FIG. 5 is a perspective view of the optional, independent damping member of the present invention.

DESCRIPTION OF THE PREFERRED EMBODIMENTS

In FIGS. 1 and 2 a variable, shock absorbing compressional mounting apparatus 10 is shown in accordance with a preferred embodiment of the present invention. The apparatus 10 generally comprises a cylindrical housing assembly 12 having first and second housing portions 14 and 16 respectively, and an internally disposed, elongated elastomer member 18, with the elastomer member 18 having a cylindrically-formed, elongated, serpentine-shaped spring 20 embedded coaxially therein.

The first housing portion 14 includes side wall and upper wall portions 22 and 24 respectively, and a lower retaining shoulder 26. The side wall and upper wall portions 22 and 24 further include inner and outer surfaces 28 and 30 respectively. Upper wall portion 24 also includes a boss portion 32 within which is formed a coaxially aligned recessed portion 34. An integrally formed, threaded mounting stud 36 also protrudes outwardly of the upper wall portion 24 and may be removably, fixedly secured to a portion of a motor, engine or any other device which generates or is subject to vibrational forces or other forces induced by movement thereof.

The second housing portion 16 is partially disposed coaxially within first housing portion 14 and includes side wall and lower wall portions 38 and 40 respectively, and an upper retaining shoulder portion 42. Shoulder portions 26 and 42 controllably limit the overall inward and outward movement of the first and second housing portions as will be discussed further in the following paragraphs.

The side wall and lower wall portions 38 and 40 further include inner and outer surfaces 44 and 46 respectively. The lower wall portion 40 further includes a coaxially-aligned boss portion 48 having a threaded, protruding mounting stud 50. Formed within boss portion 48 is a coaxially-aligned recessed portion 52.

Threaded mounting stud 50 may be removably, fixedly secured to a structure such as a frame of an automobile, or virtually any other structure that moves periodically towards or away from the structure secured to mounting stud 36. Accordingly, when the apparatus 10 is installed it will be disposed inbetween or adjacent to structures which move periodically towards and/or away from each other in an oscillating or vibrating fashion. The construction of the housing 12 enables the second housing portion 16 to move slidably within first housing portion 14 with the edges of upper retaining shoulder 42 slidably moving along inner surface 28, and the edge of lower retaining shoulder 26 slidably moving along outer surface 46. The sliding action of the first and second housing portions 14 and 16 will be discussed in more detail momentarily in connection with the operation of the overall apparatus 10.

Further included in the apparatus 10 is an optional tubular, elastomer retaining member 54 which is disposed coaxially in the area defined by the inner and outer walls 28 and 16 respectively of the side wall portions 22 and 38 respectively, and also by the upper and lower retaining shoulders 42 and 26. The operation of the elastomer retaining member 54 will be described in connection with the operation of the overall apparatus 10 momentarily.

As can be seen most clearly in FIG. 2, the cylindrical, elastomer member 18 includes boss portions 56 and 58 which rest nestably and in coaxial alignment within recessed portions 34 and 52. Accordingly, the elastomer member 18 and serpentine-shaped spring 20 are held firmly and in coaxial alignment within the first and second housing portions 14 and 16.

With brief reference to FIGS. 3 and 4, the elongated, serpentine-shaped spring 20 can be seen more clearly. Referring specifically to FIG. 3, the spring 20 comprises a preferably cylindrical form to provide columnar strength, although it should be appreciated that other slightly varying forms such as that of an ellipsis could be employed if so required for a specific application.

Referring specifically to FIG. 4, a portion of the spring 20 is shown in an "uncoiled" form to more clearly illustrate its "serpentine" shape. The spring 20 generally includes leg and root portions 60 and 62 respectively. The width of the leg portion 60 is denoted by dimension 64, while the width of the root portion 62 is denoted by dimension 66. Dimension 68, which is significantly less than either dimension 64 and 66, represents the overall thickness of the leg and root portions 60 and 62. It should be appreciated immediately that the compression and tensioning characteristics of spring 20 could be modified widely in accordance with changes in the dimensions 64, 66 and 68, and also with the type of material of which spring 20 is constructed to suit the needs of specific applications if so desired. Spring 20 is preferably constructed of metal, however, it should be appreciated that other materials could be used if required by a specific application. A more detailed description of spring 20 is provided in co-pending patent application U.S. Ser. No. 07/674,404, filed Mar. 25, 1991 now abandoned, the disclosure of which has been incorporated by reference previously herein.

With reference now to FIG. 5, an independent, U-shaped damping member 70 is shown in accordance with an alternative preferred embodiment of the present invention. The damping member 70 includes a U-shaped body portion 72 having a tab portion 74. The damping member 70 is further illustrated circumscribing a root portion 62 of spring 20 with the tab portion 74 securing the body portion 72 to the root portion 62. Although completely optional, damping member 70 further serves to limit flexing and bending of the root portion 62 which it circumscribes, to thereby further increase the damping ability of the spring 20. It should also be appreciated that by varying the dimension 76 illustrated in FIG. 5, the flexing of root portion 62 of spring 20 can be closely controlled.

In operation, when the apparatus 10 is secured between two structures via mounting studs 36 and 50, compression or tensional forces exerted by either one of the structures secured to studs 36 and 50, which causes one of the structures to move towards or away from the other, will result in a corresponding compression or tensional force on the upper wall and lower wall portions 24 and 40 respectively. The forces cause the first and second housing portions 14 and 16 respectively to move either towards or away from each other. In the instance where a compression force is being exerted, the elastomer member 18 and serpentine-shaped spring 20 therein operate cooperatively to resist movement of the housing portions 14 and 16 towards each other, and further provide a damping of the movement in accordance with a first predetermined damping characteristic.

The first damping characteristic, which is determined by dimensions 64, 66 and 68 (FIG. 4), as well as the material of which spring 20 is constructed, provides damping which is sufficient to strongly resist movement of the first and second housing portions 14 and 16 towards each other. This resistance is generated in part because the elastomer member 18 is not compressible - only deformable, which in turn helps leg and root portions 60 and 62 initially flex in response to the compression force exerted on the boss portions 34 and 52 of the elastomer member 18.

Once the predetermined amount of force is reached, the spring 20 begins to provide a second damping action by deforming (i.e., bowing or puckering root 62) along dimension 68 (FIG. 4). At this point the spring 20 becomes more "compressible" to allow more, and easier, relative movement between the first and second housing portions 14 and 16.

When tension is exerted on the threaded mounting studs 36 and 50, the force causes first and second housing portions 14 and 16 to move outwardly away from each other. Tubular elastomer retaining member 54, however, in connection with upper and lower retaining shoulders 42 and 26, operates to exert an opposing force to help dampen the outward movement of the first and second housing portions 14 and 16 relative to each other once the compression force on structure 10 decreases sufficiently. Accordingly, when structures attached to mounting studs 36 and 50 are forced apart from each other, the apparatus 10 operates to dampen this extending movement and restrict the overall extendable travel of the structures relative to each other. Tubular elastomer retaining member 54 also operates to resist forces which would tend to cause a change in a center axis extending through the first and second housing portions 14 and 16 (i.e., a force which would tend to urge housing portions 14 and 16 out of coaxial alignment. It should be appreciated immediately that the degree of damping provided by tubular elastomer retaining member 54 will vary in accordance with its dimensions and the specific material from which it is constructed. One presently, preferred construction of retaining member 54 is nylon loaded partially with molybdenum. It should also be appreciated that the boss portions 56 and 58 of the elastomer member 18 could be fixedly secured to the recessed portions 34 and 52 to provide the variable damping characteristics of elastomer member 18 and serpentine-shaped spring 20 when tensioning forces are being exerted on the mounting studs 36 and 50 of the apparatus 10. If this is the case, then a third damping action is produced which is the cooperative action of elastomer retaining member 54 and the elastomer member 18/spring 20 combination.

When constructing the apparatus 10 it is desirable to compressibly "pre-load" elastomer member 18/spring 20 combination before retaining shoulder portions 26 and 42 are formed. This helps to eliminate "play" in the apparatus 10 and provide for more positive damping responses.

The ability to provide varying degrees of damping to vibrational or other periodic forces provides several significant and highly desirable advantages over heretofore developed mounting assemblies incorporating conventional coil and leaf springs. First, the apparatus 10 can be made significantly smaller and more lightweight than many heretofore developed mounting assemblies. Secondly, many applications such as the mounting of an engine in a vehicle require that the mounting assembly provide a relatively high resistance to force to thereby adequately support the weight of the engine without causing the mounting assembly to "bottom-out" or otherwise become overly compressed. At the same time, the mounting assembly must be able to provide a lesser spring constant once loaded by the weight of the engine to more fully absorb bumps, jolts and forces of acceleration and deceleration which the vehicle is subject to during operation. Providing a mounting assembly with only a relatively high spring constant might operate to properly support the load of the engine but yet would not enable the mounting assembly to fully absorb and attenuate the external forces which the vehicle is subjected to, and hence would cause undue vibration to be transmitted to the vehicle.

With the apparatus 10 of the present invention, the two distinct damping actions enable a device such as an automobile engine to be properly supported in accordance with a relatively high spring constant, and yet provide a second spring constant once the predetermined point of force is exceeded, which allows the apparats 10 to provide less of a damping, to thereby more effectively cushion forces resulting from bumps, and acceleration and deceleration of the vehicle.

Another significant advantage of the present invention is the ability of the invention to attenuate vibrational noise normally otherwise associated with conventional mounting assemblies. Since any noise conducted through the apparatus 10 passes through the metal of serpentine-shaped spring 20, and since the spring has relatively wide, flat surfaces which are embedded within the elastomer member 18, the great majority of vibrational noise is absorbed by elastomer member 18 before such noise is transmitted through the apparatus 10. Thus, apparatus 10 provides a mounting apparatus which not only provides two distinct degrees of damping but also an apparatus which is extremely effective in isolating one of the structures to which it is attached from vibrational noise caused by a structure such as an engine secured to its opposite end.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A shock absorbing compressional mounting apparatus, said apparatus comprising:
 a mounting housing having a first housing portion and a second housing portion, said first and second housing portions positioned such that one is slidable within the other;
 an elastomer member disposed at least partially within said first and second housing portions such that said first and second housing portions each surround a portion of said elastomer member;
 an elongated, serpentine-shaped spring disposed within said elastomer member; and
 whereby disposition of said elastomer member between opposing surfaces moving relative to each other operates to provide variable damping of the relative movement of said opposing surfaces as a force causing said relative movement increases and decreases in magnitude relative to a predetermined magnitude of force.

2. The apparatus of claim 1, wherein said
 first housing portion having an upper wall and sidewall portions and a lower retaining shoulder, said first housing portion further having inner and outer surfaces;
 said second housing portion having a lower wall and sidewall portions and an upper retaining shoulder, said second housing portion further having inner and outer surfaces; and
 an elastomer retaining member disposed inbetween said upper and lower retaining shoulders and between said outer surface of said sidewall portion of said second housing portion in said inner surface of said sidewall portion of said first housing portion, said upper retaining shoulder of said second housing portion being operable to move slidably within and relative to said sidewall portion of said first housing portion and to abut portions of said elastomer retaining member, said elastomer retaining member thereby operating to further dampen relative movement between said opposing surfaces when said surfaces are moving away from each other, said elastomer retaining member also operating to resist forces that would cause a change in a center axis of said first and second housing portions.

3. The apparatus of claim 1, wherein said elongated, serpentine-shaped spring comprises a cylindrical form.

4. The apparatus of claim 1, further comprising mounting means for operatively associated with said housing with said opposing surfaces for securing said housing between said opposing surfaces.

5. The apparatus of claim 1, wherein said elongated, serpentine-shaped spring includes a plurality of leg and root portions; and
 wherein at least one of said plurality of root portions is at least partially enclosed within an independent damping member, said independent damping member being operable to limit flexing of said root portion to thereby further increase said damping provided by said apparatus.

6. A variable shock absorbing, compressional mounting apparatus, said apparatus comprising:
 a housing assembly, said housing assembly including first and second housing portions, said second housing portion being coaxially aligned with and disposed at least partially within said first housing portion and operable to move slidably inwardly and outwardly of said first housing portion;
 an elongated elastomer member disposed coaxially within said first and second housing portion and in abutting contact with portions of said first and second housing portions and with portions of each of said first and second housing portions surrounding a portion of said elastomer member;
 an elongated, cylindrical, serpentine-shaped spring disposed within said elastomer member, said spring and said elastomer member operating cooperatively to provide first and second damping characteristics; and
 whereby disposing said housing in-between and in abutting contact with opposing surfaces moving towards and away from each other in an oscillating fashion operates to dampen said oscillating movement in accordance with said first and second damping characteristics.

7. The apparatus of claim 6, wherein said first and second housing portions of said housing assembly each comprise coaxially aligned, and outwardly protruding mounting studs, said mounting studs being operable to removably fixedly secure said first and second housing portions to said inwardly and outwardly moving surfaces.

8. The apparatus of claim 6, wherein said first housing portion includes a lower retaining shoulder; and
 wherein said second housing portion comprises an upper retaining shoulder, said upper retaining shoulder being operable to move slidably against portions of an inner surface of said first housing portion and said lower retaining shoulder portion being operable to move slidably along portions of an outer surface of said second housing portion.

9. The apparatus of claim 8, further comprising a tubular, elastomer retaining member disposed coaxially within an area defined by said upper and lower retaining shoulders and said inner and outer surfaces of said first housing portion and said second housing portion respectively, said tubular, elastomer retaining member being operable to further help dampen movement of said second housing portion relative to said first housing portion at least in part because of said coaxial disposition within said area.

10. The apparatus of claim 6, wherein said cylindrical, elongated serpentine-shaped spring includes a plurality of leg and root portions, at least one of said root portions including an independent damping member at least partially circumscribing said root portion to thereby further increase said damping of said movement of said second housing portion relative to said first housing portion.

11. A variable shock absorbing compressional mounting apparatus, said apparatus comprising:
 a housing assembly having first and second housing portions, said second housing portion being coaxially aligned with said first housing portion and operable to move partially inwardly and outwardly of said first housing portion.
 said first housing portion further including upper wall and sidewall portions, a lower retaining shoulder and a threaded mounting stud integrally formed with said upper wall portion, said sidewall portion of said first housing portion further including inner and outer surfaces and said upper wall portion further including a recessed portion in coaxial alignment therewith;

said second housing portion including sidewall and lower wall portions and an upper retaining shoulder, a portion of said upper retaining shoulder being operable to move slidably against said inner surface of said sidewall portion of said first housing portion, said sidewall portion of said second housing portion having inner and outer surfaces and said lower wall portion having a recessed portion coaxially aligned therewith, said lower retaining shoulder of said first housing portion further being operable to move slidably against said outer surface of said sidewall portion of said second housing portion;

a cylindrical, elongated elastomer member disposed coaxially within said housing assembly and in abutting contact with said upper wall and lower wall portions, said cylindrical, elongated elastomer member having boss portions at its opposing ends, said boss portions resting nestably within said recessed portions of said upper and lower wall portions;

a cylindrical, elongated serpentine-shaped spring disposed within said cylindrical, elongated elastomer member, said elastomer member and said spring operating cooperatively to provide at least first and second damping characteristics to thereby dampen movement of said second housing portion relative to said first housing portion; and a tubular, elastomer retaining member disposed within an area defined by said inner and outer surfaces of said first and second housing portions and said upper and lower retaining shoulders of said second and first housing portions respectively, said tubular, elastomer retaining member further helping to dampen said movement of said second housing portion relative to said first housing portion;

whereby securing said mounting studs of said apparatus to structures moving relative to each other operates to dampen said movement of said structures in accordance with said first and second damping characteristics.

* * * * *